April 16, 1940.   C. C. STREET   2,197,198
GAUGE
Filed Feb. 18, 1939   2 Sheets-Sheet 1

INVENTOR.
CHAUNCEY C. STREET.
BY Walter E. Schismer
ATTORNEY.

April 16, 1940.      C. C. STREET      2,197,198
GAUGE
Filed Feb. 18, 1939      2 Sheets-Sheet 2
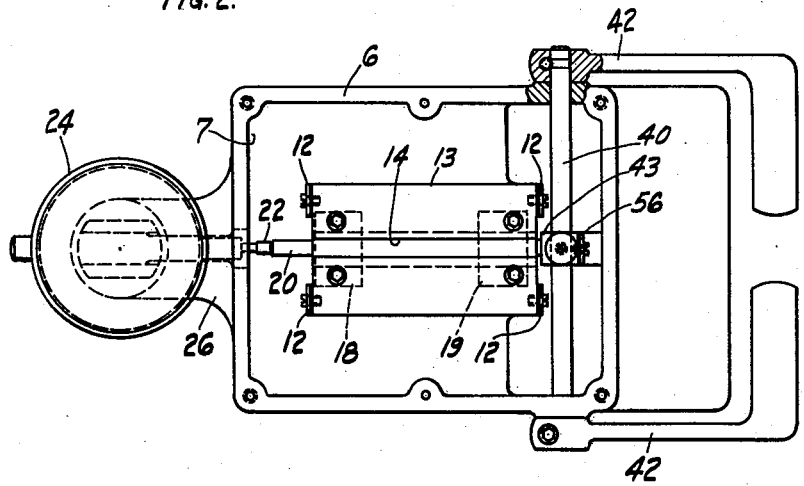
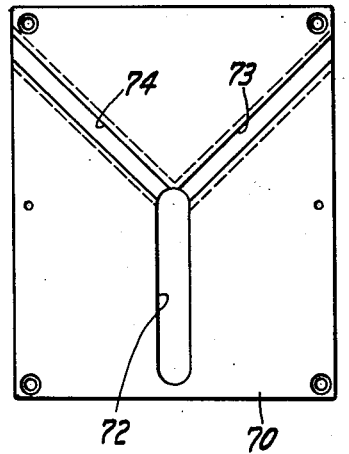 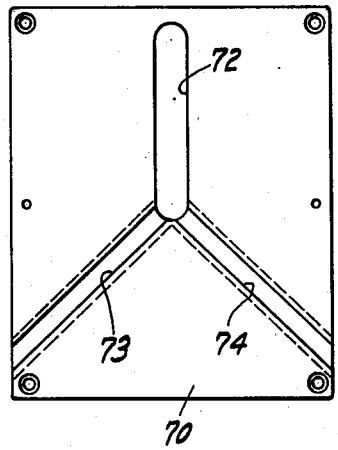
INVENTOR.
CHAUNCEY C. STREET.
BY Walter E. Schirmer
ATTORNEY.

Patented Apr. 16, 1940

2,197,198

UNITED STATES PATENT OFFICE 2,197,198

GAUGE

Chauncey C. Street, Providence, R. I., assignor to Harold Frauenthal, South Bend, Ind.

Application February 18, 1939, Serial No. 257,118

10 Claims. (Cl. 33—178)

This invention relates to gauges, and more particularly is directed to gauges for measuring and testing apertures for size and roundness. However, the gauge is also adaptable for checking the outside diameter of round parts, or for checking by three point contact apertures above a predetermined size.

Gauges for testing and measuring apertures to ascertain their comparative identity to a predetermined standard, or for determining their absolute identity, have been known heretofore. One such type of gauge is shown in the patent to Frauenthal, No. 1,625,462, issued April 19, 1927. The present construction has for one of its primary objects to improve and widen the field of application of this type of gauge.

One of the advantages of the present construction is the adaptability thereof for measuring either apertures or round parts and testing the same for roundness or eccentricity. This is provided by quickly detachable face plates adapted to be secured to the instrument in interchangeable relationship, and so designed as to allow rapid accurate determination of the exact shape and dimensions of the parts being measured.

Another advantage of the present invention resides in the provision of an improved pantograph type spring assembly upon which the movable gauge element is supported. This allows accurate and controlled movement of this element into measuring position, and at the same time indicates the amount of such movement on the dial of an indicator fixed to the instrument and constantly having its stem engaged by the spring assembly.

Another feature of the present invention is the provision of a simplified sturdy gauge construction, having substantially frictionless moving parts, and capable of giving uniform results whereby measurements may be made which are not only relative for one particular piece to be measured, but comparative for inspection purposes of precision parts such as employed in the automotive industry.

The present invention provides for three basic types of measurement for both external and internal dimensions when applied to cylindrical parts. These may be classified as follows:

1. Two-point contact in which the two measuring points are formed so as to be approximately similar to the size and shape of the work being measured.

2. Three-point, in which the value determined is a function of an isosceles triangle of which two determining points are fixed and the third movable.

3. Three-point measuring system but the measurement is made on the diameter of the work with a fixed contact to locate the work properly between the measuring points.

The three-point triangular method is found superior on production runs since it is rapid in action, and immediately indicates the errors resulting from out of round work, such as may be produced by centerless grinders. Where the only available means of determining the standard is a micrometer or size blocks, the three point diameter method of measurement may be employed. The first type of measurement produces advantages only when the parts are too minute for either of the other two procedures.

The face plates designed for use with the present type of gauge are preferably made interchangeable and reversible so that any one plate can be used for either external or internal work, and a single gauge mechanism can be equipped with various types of plates.

Another feature of the present invention is the provision of a pantograph spring assembly supporting the movable contact member and which is so arranged as to be free of fixed parts of the mechanism for floating movement during the measuring operation. Preferably, means are provided for limiting the travel of the pantograph mechanism to prevent overstressing of the springs. This limiting of the movement is desirable so that at no time during rapid operation can the springs be moved beyond predetermined limits, and secondly, so that the amount of motion which the hand of the operator must travel through is limited, which will increase the efficiency in inspection, as well as rapidity thereof.

Other objects and advantages of the present invention will be more apparent to those skilled in the art from the following detailed description which, taken in conjunction with the accompanying drawings, will disclose to those skilled in the art the particular construction and operation of a preferred form of the present invention.

In the drawings:

Figure 2 is a top plan view of the instrument with the face plate removed;

Figure 5 is a plan view of a modified form of face plate; and

Figure 6 is a plan view of a face plate similar to that shown in Figure 5 for measuring the outside diameter of round parts.

Figure 1:
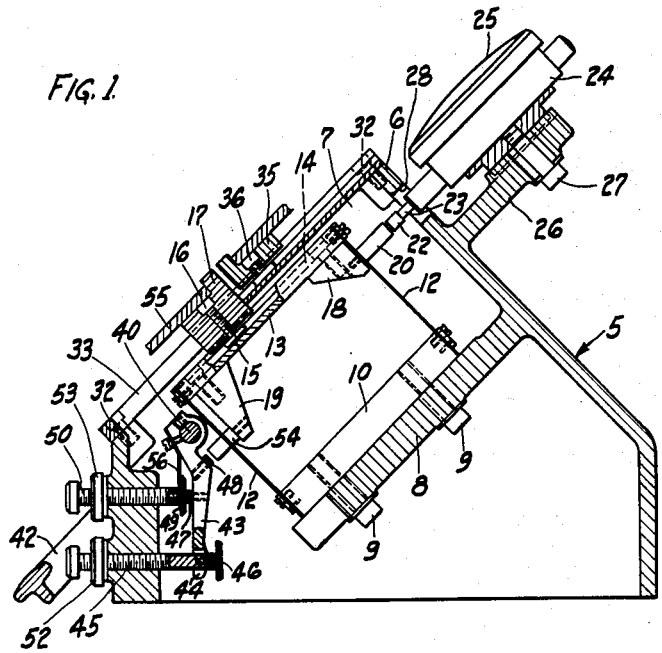
Figure 1 is a sectional elevational view of one form of the present invention.
Figure 3:
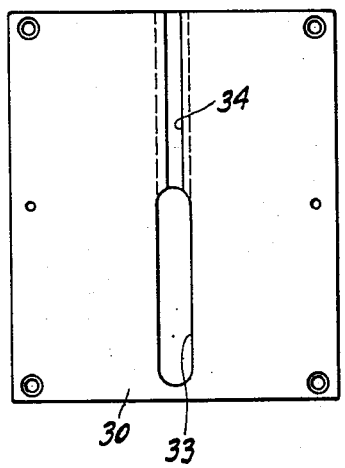
Figure 3 is a plan view of the face plate used for measuring one type of aperture.

Considering now the drawings in detail, the gauge mechanism itself is shown in Figures 1 and 2 and constitutes a base member 5 having an inclined flange portion 6 defining a rectangularly shaped face plate receiving portion or opening 7. The base 5 is provided with an intermediate web portion 8 upon which is mounted by means of the cap screws 9 a block member 10 having secured at opposite ends thereof normally extending spring members 12 in the form of leaf springs or the like. Preferably, four such spring members are provided, a pair of the springs being mounted at each end of the block in laterally spaced relationship. At the upper ends the springs 12 are secured to a second block member 13 having a longitudinally extending channel-shaped recess 14 therein within which is mounted the head end 15 of a clamp screw 16 which extends through the movable contact element 17. At the corners forming the intersection between the springs 12 and the block 13 are contact blocks 18 and 19, respectively, which are secured to the block 13 by means of suitable cap screws or the like on opposite sides of the channel 14. One of the blocks 18 is provided with an abutment or stud 20 projecting normally with respect to the springs 12, and adapted to have abutting engagement with the end 22 of the indicator plunger 23 projecting from the indicator 24. This indicator is of the type whereby movement of the plunger 23 longitudinally effects rotation of a dial hand carried beneath the face 25 of the indicator, and suitable spring means within the indicator normally urges the plunger 23 outwardly thereof.

The indicator 24 is supported upon a suitable integral extension 26 of the base 5 and may be adjusted toward or away from the pantograph spring assembly by means of the adjusting nut 27. It will be noted that the base member 5 is suitably apertured, as indicated at 28, for receiving the projecting plunger and support of the indicator.

Mounted on the flange face 6 of the base 5 of the gauge is a face plate which may be of any of the types shown in Figures 3 to 6, inclusive. In Figure 1 the face plate is shown as being of the type shown in Figure 3 and indicated generally at 30. This plate has suitable openings therein whereby suitable cap screws 32 may be employed for securing it to the flange 6 of the gauge. The plate is provided with a longitudinally extending opening 33 which has a channeled extension 34 projecting in alinement from one end thereof, this channeled extension 34 being adapted to form a guide for receiving the fixed contact member 35 which is secured in adjusted position within the guide 34 by means of the clamp screw 36. It will be obvious that the contact member 35 may be secured in any position along the guide channel 34, depending upon the size of the aperture which is to be measured.

Extending transversely across the base member 5 is a shaft 40 which has mounted thereon on opposite sides of the shaft hand levers 42, as shown more clearly in Figure 2, which are employed for actuating the movable contact to close the same so that work may be mounted over the contact members. The shaft 40 within the base member 5 is provided with a depending arm 43 which is keyed or otherwise secured for conjoint rotation with the shaft, and which has a forked end 44 at its base adapted to lie over an adjusting screw 45 extending into the base from the front face thereof. The screw 45 has a collar or disc 46 screwed in the end thereof against which the ears 44 of the arm 43 are adapted to engage to limit counter-clockwise rotation of the arm 43 and the shaft 40. Intermediate its ends the arm 43 is provided with two abutment screws 47 and 48. The abutment screw 47 is adapted to engage the end 49 of a second adjusting screw 50 carried in the front face of the base 5, and limits clockwise rotation of the arm 43 and shaft 40 so that the two adjustment screws 45 and 50 thereby limit the travel of the shaft 40, and consequently of the arm 43. Suitable locking means 52 and 53 is provided for each of the adjusting screws 45 and 50 to lock them in the desired adjusted position.

The contact screw 48 is adapted to have engagement with the abutment screw 54 carried by the contact block 19 in order to move the pantograph spring assembly to the right, as viewed in Figure 1 when it is desired to close the members 17 and 35 to move work thereover. However, when the work, such as indicated at 55, is being measured the contact screw 48 is out of engagement with the abutment 54 so that the pantograph assembly has free floating movement entirely under the influence of the spring of the indicator 24.

Considering now the manner in which the gauging pressure is determined for the present type of gauge, the locking nut 53 is first released and the screw 50 is backed out until it is apparent that the pantograph spring assembly is floating freely and is no longer touching the stop 48. If, under such conditions, the contact 20 does not touch the indicator stem, the screw 27 may be adjusted and the indicator moved longitudinally along the support 26 until a reading is shown on the indicator. It will be apparent that the instrument now has no fixed stopping point, but that the measuring contact 17 is freely floating in such a manner that the tension of the pantograph springs 12 are counteracting or balancing the pull back spring on the indicator plunger.

In the preferred embodiment of the present invention, as actually used, the pantograph spring assembly has been so designed and calculated that it requires one kilogram of force to deflect the spring assembly .100 inch. Of course, this may be changed, depending upon the type of work being measured and the amount of contact pressure desired, but assuming that such a condition is present and that a value of one kilogram has been selected as the contact pressure, it is then obvious that the pantograph spring assembly must be deflected .100 inch when in the gauging position. To accomplish this the indicator is set to zero by rotating the bezel, then the screw 50 is rotated in a clockwise direction until it causes the pantograph spring assembly to be deflected. The amount of this deflection will obviously be shown on the indicator.

Assuming that the indicator is of the type which is graduated in .0001 of an inch, then when the number of revolutions of the hand caused by rotating the screw 50 inwardly reaches 10, the gauge has been set for a measuring tension of one kilogram.

The master is now placed on the gauge and the contact points are adjusted so that they are just touching the work when the pantograph spring is in the position as set by the indicator. This may be checked by locking the contact points and slightly backing off the screw 50. After the contacts have thus been finally set the master is removed and the screw 50 is backed off in counter-clockwise direction and the indicator reading is watched until it has made about one-half a revolution, or .005 of an inch. This is to allow for slight over travel of the contact points from the nominal size. After this position has been determined the lock nut 53 is tightened.

It is also desirable to eliminate over travel of the depressing lever 42 so that screw 45 is then turned in a clockwise direction until it prohibits any movement of the lever 42. By then turning the screw 45 in the opposite direction and applying a slight pressure to the lever 42, the amount of travel of the pantograph springs can be determined by noting the indicator reading. If the indicator is then allowed to travel through a distance of .01 of an inch while screw 45 is being turned, there will then be a total travel of .01 inch between the two stop positions. The lock nut 52 is then tightened to prevent further movement of the screw 45.

As shown in section in Figure 2, the adjustment of the lever 42 may be changed at will by reason of the clamping arrangement of this lever about the shaft 40, and the lever can be adjusted for the most convenient operating position.

It should also be noted that a small spring element 56 is secured in an offset position with respect to the arm 45, and engages back of the collar 49 to insure return of the arm 43 to a position such that contact point 47 will always return into engagement with collar 49 to insure that there will be no contact between contact point 48 and abutment 54 that would interfere with the free floating movement of the spring assembly.

The operation of the mechanism with the face plate 30 has been described in some detail, but it should be noted that with this type of work only two contact points are provided: one fixed and the other movable, and it is desirable to employ such a face plate only for very minute openings which cannot be measured satisfactorily by either of the three-point types of measurement. With such a construction the contact members 17 and 35 and the contact portions thereof form two approximate facsimiles of the opening being measured. With the plate 60, shown in Figure 4, a three-point type of measurement is employed in which the measurement is made along the diameter of the opening with a fixed contact employed to properly locate the works between the measuring points. With such a plate, the movable contact is arranged to operate in the slot 62 moving toward and away from fixed contact carried in a channel-shaped slot 63 arranged in alinement with the slot 62. The fixed contact in channel 63 and the movable contact in slot 62 work along a diameter of the work, while a second fixed contact is provided in the normally extending channel guide 64, which properly locates the work between the measuring points to insure a proper diametrical measurement.

In the face plate shown in Figure 5 and indicated at 70, the movable contact such as the contact 17 carried by the pantograph spring assembly operates in a guide slot 72 extending longitudinally of the plate. However, in place of the channel-shaped guide 34 in which the fixed contact 35 is positioned, as shown in Figure 1, a pair of diverging channel-shaped guide slots 73 and 74 are provided, and fixed contacts are located in each of these slots whereby two of the determining points of the triangle are fixed and the third point or movable contact moves in the slot 72 so that the value determined is a function of an isosceles triangle having two fixed points and a movable third point.

When the face plate 70 of Figure 5 is reversed in position, as shown in Figure 6, the plate can be used for measuring the outside diameter of parts with the movable member being adjusted in position along the guide slot 14 of the pantograph spring assembly so as to be properly located with respect to the slot 72 in the face plate. Two fixed contacts are provided for positioning in the slots 73 and 74 to provide the desired triangular arrangement for measuring the outside diameter of these parts.

Figure 4:
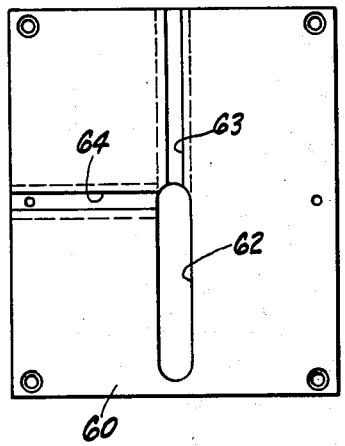
Figure 4 is a plan view of a modified form of face plate for measuring larger apertures.

It is obvious that the same type of measurement may be used by reversing the face plate 60 of Figure 4 to measure outside diameters of parts, and that, therefore, with a single gauge and the removable face plates, a large variety of different measurements may be made by mere interchange of the face plates.

Another advantage which is obvious from the description of the invention is that the floating arrangement of the pantograph spring assembly insures a uniform contact pressure on all of the work being measured, and prevents any possible over-stressing of the spring means which might tend to vary their characteristics. The sole actuating force for moving the movable contact member into operating position is the precalculated stress of the indicator spring which is counterbalanced by the pantograph springs to provide the desired contact pressure. The adjustable stop means insures the fixing of any desired contact pressure, and prevents any possible overtravel of the spring assembly when the operator actuates the closing lever.

I am aware that various changes may be made in certain of the details of the present construction, and I therefore do not intend to be limited except as defined by the scope and spirit of the appended claims.

I claim:

1. In a gauge, a base having an inclined face and a parallel intermediate web, a spring assembly mounted on said web and including normally extending spaced leaf springs having a top portion secured between the free ends thereof and movable substantially parallel to said face, a face plate secured to said face having a way and a slot, a fixed gauge element secured in the way on said face plate, a gauge element fixed to said top portion and guided for movement in the slot in said plate relative to said fixed element, an indicator mounted on said base and operatively engaged by said assembly, and means limiting movement of said assembly.

2. In a gauge, a base having an inclined face, a face plate mounted thereon and having a longitudinal slot and a channel extending in alinement thereon, a fixed gauge element in said channel, an indicator mounted on said base and having a movable operating stem extending into said base below said plate, a resiliently supported block carried by said base and movable longitudinally beneath said plate, means carried by said block engaging said stem, a second gauge element carried by said block and extending through said slot for movement toward and away from said fixed gauge element, and lever actuated means for moving said block against said stem pressure and for limiting the contact pressure of said gauge elements, said lever means including a spring normally urging it out of contact with said block.

3. In a gauge, a base having an inclined face plate mounted thereon, a longitudinal slot in said plate, a pantograph spring assembly mounted in said base and having an upper portion movable parallel to and beneath said plate, a contact element carried in said upper portion and movable in said slot, fixed contacts carried in said plate in such position that said movable contact element forms the apex of a variable isosceles triangle, an indicator carried by said base and having a spring-pressed plunger engaging said spring assembly, and means for imparting a predetermined contact pressure to said contact element.

4. A precision gauge comprising a base having an inclined face and an inclined pantograph spring assembly therebeneath, an indicator mounted on said base and having a plunger engaging said spring assembly, means limiting movement of said spring assembly in one direction under the influence of said plunger, an operating lever, means actuated by said lever for moving the assembly in the opposite direction against said plunger, a slotted face plate mounted on said face, a contact carried by said assembly and movable in the face plate slot upon movement of the assembly, a contact fixed on the plate, and means limiting movement of said lever-actuated means in a direction opposite to that of said first-named movement limiting means.

5. The combination of claim 4 wherein said movement-limiting means are both out of contact with said spring assembly during measurements of work received by said contacts, said assembly being actuated solely by the pressure of said plunger thereagainst.

6. A spring assembly for a precision gauge of the class described wherein a slotted face plate is provided with one or more fixed contacts and the spring assembly carries a contact movable in the slot relative thereto, comprising a first block secured to the gauge, a pair of normally extending laterally spaced springs at each end of said block, a second block carried between the free ends of said springs and movable substantially parallel to said fixed block and said plate upon deflection of the springs, a longitudinal channel in the second block, and a contact element having friction means adapted to be clamped in said slot to secure said element for movement with said second block.

7. A gauge comprising a base having an inclined face plate with a slot therein, a spring assembly mounted in said base and having a contact element movable longitudinally in said slot, a transverse shaft in said base having an external actuating lever and an internal arm, adjustable stop means limiting movement of said arm within predetermined limits, an abutment carried by said arm and adapted to contact said spring assembly for deflecting the same in one direction, an indicator mounted on said base and having a plunger normally urging said assembly in the opposite direction, and spring means carried by said arm for normally urging it out of contact with said assembly.

8. A gauge comprising a base having an inclined face and a sub base extending parallel to and beneath said face, a pantograph spring assembly carried on said sub-base and including a block resiliently movable substantially in the plane of said face, a face plate secured over said face above said block and having a slot therein, a gauge element on said block guided for movement in said slot, a second gauge element fixed on said plate, an indicator mounted on said base and having an actuating stem engaging said block for indicating the longitudinal movement thereof, and means for varying the position of said indicator longitudinally relative to said block.

9. A gauge comprising a base having an inclined face and a sub base extending parallel thereto, a pantograph spring assembly carried on said sub base and having a block movable longitudinally in substantially the plane of the face, an indicator having an indicator stem operatively engaging one end of said block, a face plate secured over said face and having a slot therein, a contact element carried by said block and movable in said slot, a fixed contact element carried by said plate, and adjustable stop means limiting movement of said block away from said indicator, and including means for imparting a predetermined contact pressure to said first contact element.

10. A gauge comprising a base having an inclined face, a face plate carried thereon and having a slot therein and a fixed projecting contact element, an intermediate base web carrying a pantograph spring assembly including a block longitudinally movable beneath said plate and having a contact element guided in said slot, an indicator carried by said base and having an actuating stem engaging one end of said block, lever means carried by said base including an arm adapted to move said spring assembly against the pressure of the stem to adjust the contact pressure of the movable contact element.

CHAUNCEY C. STREET.